(12) United States Patent
Kochenburger

(10) Patent No.: US 7,058,554 B1
(45) Date of Patent: Jun. 6, 2006

(54) METHOD OF CONTROLLING THE COSTS ARISING DURING OPERATIONS OF AN INSTALLATION

(75) Inventor: Andreas Kochenburger, Herxheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/069,189

(22) PCT Filed: Apr. 10, 2000

(86) PCT No.: PCT/DE00/01104

§ 371 (c)(1),
(2), (4) Date: Oct. 22, 2001

(87) PCT Pub. No.: WO00/65495

PCT Pub. Date: Nov. 2, 2000

(30) Foreign Application Priority Data

Apr. 22, 1999 (DE) ................................ 199 18 332

(51) Int. Cl.
*G06F 17/10* (2006.01)
(52) U.S. Cl. .......................................... 703/2; 705/400
(58) Field of Classification Search ...... 703/2; 700/29, 30; 702/85; 705/7, 400
See application file for complete search history.

(56) References Cited

U.S. PATENT DOCUMENTS

| | | | | |
|---|---|---|---|---|
| 3,617,717 A | * | 11/1971 | Smith | 708/8 |
| 4,325,223 A | * | 4/1982 | Haynes | 62/126 |
| 5,291,397 A | | 3/1994 | Powell | |
| 5,347,446 A | * | 9/1994 | Iino et al. | 700/29 |
| 6,272,440 B1 | * | 8/2001 | Shakespeare et al. | 702/85 |
| 6,496,957 B1 | * | 12/2002 | Kumagai | 716/4 |

FOREIGN PATENT DOCUMENTS

DE 42 13 335 A1 10/1993
EP 0 731 397 A1 9/1996

* cited by examiner

*Primary Examiner*—Albert W. Paladini
(74) *Attorney, Agent, or Firm*—Harness, Dickey & Pierce, P.L.C.

(57) ABSTRACT

A method of keeping a check on the costs arising during the operation of an installation involves recording the operating state of least one component of the installation by use of a status message. This status message is fed to a computer model of the installation, in which the actual cost values arising are determined and compared with predeterminable set values. The deviation between actual values and set values is then indicated.

20 Claims, 2 Drawing Sheets

METHOD OF CONTROLLING THE COSTS ARISING DURING OPERATIONS OF AN INSTALLATION

This application is the national phase under 35 U.S.C. § 371 of PCT International Application No. PCT/DE00/01104 which has an International filing date of Apr. 10, 2000, which designated the United States of America, the entire contents of which are hereby incorporated by reference.

FIELD OF THE INVENTION

The present invention generally relates to a method of keeping a check on the costs arising during the operation of an installation. In particular, it relates to an installation for converting fossil fuels into energy, the operating state of least one component of the installation being recorded by means of a status message.

BACKGROUND OF THE INVENTION

In known installations, for example energy generating installations, a process control system (PCS) is used for controlling and monitoring the conversion of fossil fuel into energy, in particular electric power and/or heat. This PCS provides information on the current state of individual components of the installation and the conversion process taking place. However, for the operator of the installation, the conversion process in itself is, from a commercial viewpoint, only an intermediate step toward the final product, for example electrical energy. It is disadvantageous in particular to a known PCS that only installation-specific warnings are output, for example when certain limit values for temperature or pressure are exceeded. No warning is given to avoid unnecessary costs. Rather, certain parameters which are to be maintained during operation are predetermined during the design of the installation. It is not possible for any actual direct check to be kept on costs when the installation is running.

SUMMARY OF THE INVENTION

It is therefore the object of the present invention to provide a method by which a check can be kept on the operating costs during the operation of an installation.

This object is achieved according to the invention in the case of a method of the type stated at the beginning by the status message being fed to a computer model of the installation, the cost values arising in one or more components of the installation are determined by the computer model and compared with predeterminable set values for the costs and the deviation between actual values and set values is indicated.

The status messages of individual components permit a calculation of the cost values arising in the components and of the overall costs of the installation. When determining the cost values, the earnings from the delivery of the final product, in particular energy, are taken into account. Consequently, from a commercial viewpoint, not only the expenditure arising but also the earnings realized are taken into account. In individual cases, operation of the installation under conditions which are not ideal, causing greater expenditure, may be justified by increased earnings. The calculated cost values are compared with theoretically determined set values and the deviation is indicated. As a result, a check on the costs arising is achieved independently of the conversion process actually taking place. At the same time, information on the cost-effectiveness of the installation is provided by the comparison of the cost values with the set values. Status messages in the sense of the invention may in this case be analog and binary measured variables and derived status signals from parts of the installation and components.

Advantageous configurations and developments of the invention emerge from the dependent claims.

In a first advantageous configuration, when determining the cost values, the expenditure on basic operating materials, in particular the fuel, is taken into account. This expenditure provides information on the actual, directly operation-related financial investment.

According to a second advantageous configuration, when determining the cost values, the expenditure on the installation, in particular for depreciation, own consumption, personnel and/or maintenance, is taken into account. As a result, along with the expenditure on fuel, the wear and tear of the installation and the components, payroll costs and other regular expenses are also included. The computer model then identifies less demanding operation of the installation, which for example reduces the depreciation or extends the maintenance intervals. In spite of possibly higher fuel expenditure, altogether lower operating costs can be achieved.

If a predeterminable deviation of the cost values from the set values is exceeded, a warning is advantageously output. This warning makes the operating personnel aware of the situation and draws their attention to uneconomical operation of the installation. The cost consciousness of the operating personnel is therefore significantly improved.

According to an advantageous development, if a predeterminable deviation of the cost values from the set values is exceeded, a manual input by a user is requested. The manual input serves as confirmation that the uneconomical operation is actually intended, for example for purposes of testing the installation. This input further improves once again the cost consciousness of the operating personnel.

In an advantageous configuration, if a predeterminable deviation of the cost values from the set values is exceeded, a request to check the component with the deviation is output. The method according to the invention not only indicates increased costs, but also provides solution proposals for reducing costs. The corresponding technical information can be input into the computer model and taken into account in the simulation of the conversion process. Malfunctions of the installation can be quickly identified and eliminated.

The status messages and/or computational results of the computer model may be fed to a proposals system for automatically determining one or more proposals for improving the cost-effectiveness of the installation. In particular, it is possible to determine proposals which suggest continued operation of the installation in spite of a deterioration in one or more cost items with regard to the cost-effectiveness of the overall installation or to determine proposals which advise a need for indirect or direct action, for example maintenance to be carried out.

This configuration permits a combination of the status messages received in relation to the individual components. Since the components are interconnected by the process taking place in the installation, it can be assumed that the operating state of an upstream component influences the operating state of a downstream component. Combining the individual status messages with one another has the effect that such interactions between the individual components are reliably detected and instances of misdiagnosis are avoided. As an alternative or in addition to the status messages, computational results of the computer module may also be used.

According to an advantageous development, the determination of the proposal or proposals is optically and/or acoustically shown on a display and/or transmitted to a higher-level system. As a result, the attention of the operating personnel is drawn to proposals determined by the proposals system. The transmission to a higher-level system permits a central data acquisition and administration for installations spatially separated from one another.

The operation of the installation is advantageously monitored by a separate process control system. The computer model runs independently of the installation and does not independently intervene in the operation of the installation. As a result, reliable operation of the installation is ensured. Furthermore, the method according to the invention can be retrospectively implemented in existing installations.

According to an advantageous development, the status messages are transmitted to the process control system and from there to the computer model. The status messages recorded in already existing installations are generally adequate for the computer model. Additional measuring instruments are not required, with the result that the computer model can be retrospectively implemented with minimal expense.

BRIEF DESCRIPTION OF THE DRAWINGS

The invention is described in more detail below on the basis of an exemplary embodiment, which is represented in a schematic way in the drawing, in which.

DETAILED DESCRIPTION OF THE PREFERRED EMODIMENTS

Figure 1:
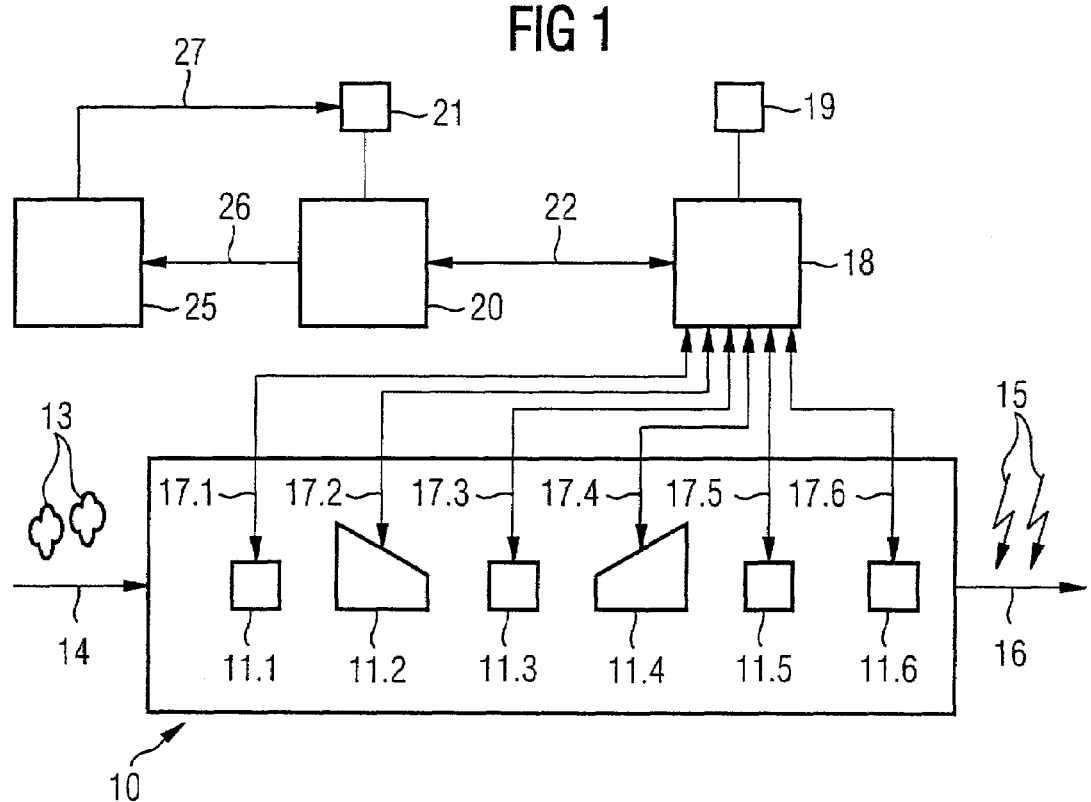
FIG. 1 shows a schematic representation of an installation and of a conversion process.

FIG. 1 shows by way of example a schematic representation of an installation 10 for the conversion of a fossil fuel 13 into energy 15. The installation 10 comprises a series of different components 11.1, 11.2, . . . , 11.6. The fuel 13 is fed to the installation 10 in the direction of the arrow 14. In the installation 10, a conversion process takes place, in which the fuel 13 is converted by the components 11.1, 11.2, . . . , 11.6 into energy 15. The energy is delivered in the direction of the arrow 16 to consumers, not represented in any more detail for the sake of brevity.

For monitoring and controlling, or automatically controlling, the installation 10 and its components 11.1, 11.2, . . . , 11.6 and also the conversion process, a process control system (PCS) 18 is provided. The operating state of the components 11.1, 11.2, . . . , 11.6 is reported to the PCS 18 by means of status messages 17.1, 17.2, . . . , 17.6. The PCS 18 is connected to an input and output unit 19 for displaying the operating state and for the input of commands.

According to the invention, a computer model 20 of the installation 10 is provided in addition to the PCS 18. Like the PCS, the computer model 20 is connected to an input and output unit 21. It includes a theoretical model of the installation 10 and its components 11.1, 11.2, . . . , 11.6 and determines the costs arising in the components 11.1, 11.2, . . . , 11.6 and also the overall costs of the installation 10. The required information is supplied by the PCS 18 to the computer model 20, as schematically represented by the arrow 22. Therefore, dedicated measuring instruments are generally not required for the operation of the computer model 20. Depending on the embodiment, the computer model 20 may also transmit information back to the PCS 18.

In the embodiment according to the invention as shown in FIG. 1, a proposals system 25 is also provided. The status messages 17.1, 17.2, . . . , 17.6 and/or computational results of the computer model 20 are fed to this proposals system 25, as indicated by the arrow 26. On the basis of the status messages 17.1, 17.2, . . . , 17.6 and/or the computational results, the proposals system 25 determines one or more proposals for improving the cost-effectiveness of the installation 10. These proposals are passed on to the input and output module 21, as represented by the arrow 27.

To increase accuracy, it is possible for not only current information on the operating state of this type of the installation 10 to be used but also predicted information.

Figure 2:
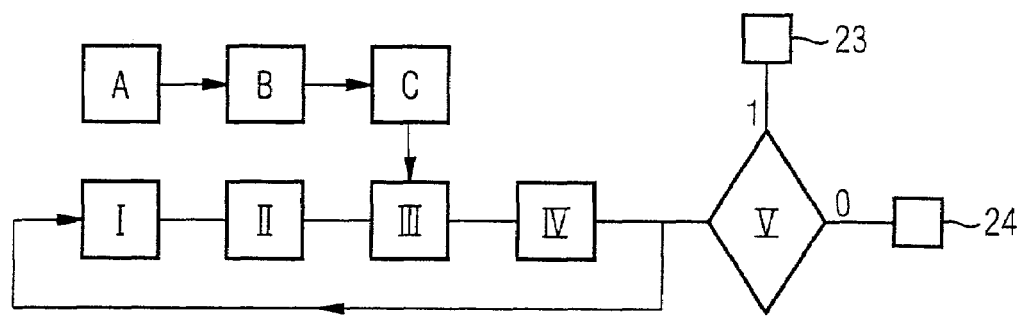
FIG. 2 shows a flow diagram of the method according to the invention.

FIG. 2 shows a flow diagram of the method according to the invention. In step I, the operating state of the components 11.1, 11.2, . . . , 11.6 is recorded by means of status messages 17.1, 17.2, . . . , 17.6. These status messages 17.1, 17.2, . . . , 17.6 are transmitted in step II to the computer model 20. According to step III, the computer model 20 determines the costs arising in the individual components 11.1, 11.2, . . . , 11.6. In step IV, the determined costs are compared with the predetermined set values for the costs. If the difference is less than a predetermined deviation, this is transmitted to a display 23 according to branch 1. This display 23 may be integrated into the input and output module 21 or be fed to the input and output module 19 via the PCS 18. In the event of relatively great differences, a warning requesting acknowledgement 24 is output, according to branch 0. A request for testing may be output together with the warning.

When the costs are determined in step III, different influences can be taken into account. According to step A, the expenditure on the fuel 13 is taken into account. In step B, the expenditure on the installation 10, such as maintenance, depreciation, own consumption, personnel, etc., is additionally taken into account. Step C permits the inclusion of the earnings achieved by the delivery of the energy 15. Consequently, all the commercial factors of the earnings side and expenditure side can be taken into account in the computer model 20.

Figure 3:
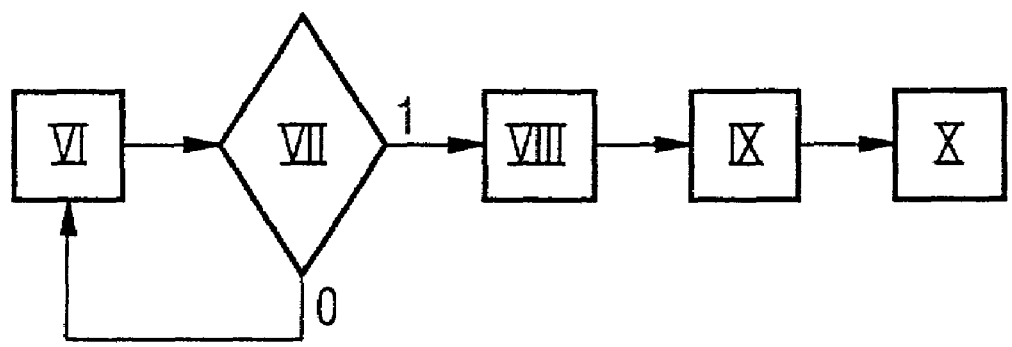
FIG. 3 shows a flow diagram of the automatic creation of proposals.

FIG. 3 shows a flow diagram for the automatic creation of proposals according to the proposals system 25. Firstly, in step VI, the status messages 17 received by the computer model 20 and possibly further values are compared with reference patterns stored in advance. These reference patterns are stored installation-specifically for different operating states. Subsequently, in step VII, the proposals system 25 carries out a comparison between the reference patterns and the information received. If, in this comparison, no coincidence is established, a return is made to step VI according to branch zero. If the proposals system 25 establishes a certain quality of coincidence, the next reference pattern is selected according to branch 1 in step VIII and the corresponding proposal or proposals is or are output. The output may take place either on the input and output module 21, as represented in FIG. 1. Alternatively, output on the input and output module 19 of the PCS 18 is of course also possible. The determination and output of the proposal or proposals are displayed optically and/or acoustically and the attention of the operating personnel is aroused here by. As an alternative or in addition, according to step IX, a report may be prepared and stored. Thereafter, in step X, it is transmitted to a higher-level system, such as for example a PC network or production-management system, for further handling.

The proposals created by the proposals system 25 can be selected from a set of installation-specific preprogrammed directions for action to the operating personnel. They may, however, also contain automatically generated information, such as the information code of the component 11.1, 11.2, . . . , 11.6 concerned of the installation 10, current and theoretically achievable operating parameters and also the status message 17.1, 17.2, . . . , 17.6.

Combining the individual status messages 17.1, 17.2, . . . , 17.6 with one another and possibly adding further computational results of the computer model 20 has the effect of creating a reliable picture of the installation 10. This picture takes into account that the components 11.1, 11.2, . . . , 11.6 of the installation 10 influence one another. An unsatisfactory operating state of the components 11.6 does not necessarily have to be attributable to a fault of the component 11.6, but may also be caused by the upstream components 11.1, 11.2, . . . , 11.5. Such states of the installation 10 are reliably avoided by combining the individual status messages 17.1, 17.2, . . . , 17.6 with one another.

If, for example, a deterioration in the logarithmic mean temperature difference (LMTD) of the cooling water at the condenser of a power plant is detected, the proposal to clean the main condenser at the next opportunity is created. The proposals system 25 at the same time takes the next planned installation shutdown into account here and determines whether it is commercially more advisable for the installation 10 to be shut down immediately and cleaned immediately or to be operated in a state which is not ideal. The proposal made by the proposals system 25 is generated on the basis of its high commercial improvement potential, since a poor LMTD is an indication of a poor vacuum of the main condenser and consequently of a deteriorated overall level of efficiency of the installation 10.

Major deviations of the calculated costs from the predetermined set values are displayed on the input and output module 21 and require an acknowledgement by the operating personnel. As a result, not only is a check kept on the costs while the installation 10 is in operation, but the cost consciousness of the operating personnel is also significantly improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of keeping a check on costs arising during the operation of an installation for delivering a final product, comprising:
   recording an operating state of at least one component of the installation based on a status message;
   feeding the status message to a computer model of;
   determining, via the computer model, actual cost values arising in at least one component of the installation, taking into account expenditures arising and earnings realized from delivery of the final product;
   comparing the determined actual cost values with predeterminable set values for costs; and
   indicating a deviation between the determined actual cost values and the set values for costs.

2. The method as claimed in claim 1, wherein, when determining the actual cost values, an expenditure on basic operating materials is taken into account.

3. The method as claimed in claim 1, wherein, when determining the actual cost values, the expenditure on the installation is taken into account.

4. The method as claimed in claim 1, further comprising:
   outputting a warning if a predeterminable deviation of the determined actual cost values from the set values for costs is exceeded.

5. The method as claimed in claim 1, further comprising:
   requesting a manual input if a predeterminable deviation of the determined actual cost values from the set values for costs is exceeded.

6. The method as claimed in claim 1, further comprising:
   outputting a request to check the component with the deviation if a predeterminable deviation of the determined actual cost values from the set values for costs is exceeded.

7. The method as claimed in claim 1, further comprising:
   feeding at least one of the status messages and computational results of the computer model to a proposals system for automatically determining at least one proposal for improving cost-effectiveness of the installation.

8. The method as claimed in claim 7, wherein the determination of the at least one proposal is at least one of shown on a display and transmitted to a higher-level system.

9. The method as claimed in claim 1, wherein the operation of the installation is monitored by a separate process control system.

10. The method as claimed in claim 9, wherein the status messages are transmitted to the process control system and the status messages are transmitted from the process control system to the computer model.

11. The method as claimed in claim 2, wherein, when determining the cost values, the expenditure on the installation is taken into account.

12. The method of claim 1, wherein the installation is an installation for converting fossil fuels into energy.

13. The method as claimed in claim 12, wherein, when determining the actual cost values, an expenditure on the fuel is taken into account.

14. The method of claim 1, wherein the expenditure includes at least one of depreciation, consumption and maintenance.

15. The method of claim 13, wherein the expenditure includes at least one of depreciation, consumption and maintenance.

16. The method as claimed in claim 13, further comprising:
   outputting a warning if a predeterminable deviation of the determined actual cost values from the set values for costs is exceeded.

17. The method as claimed in claim 13, further comprising:
   requesting a manual input if a predeterminable deviation of the determined actual cost values from the set values for costs is exceeded.

18. The method as claimed in claim 13, further comprising:
   outputting a request to check the component with the deviation if a predeterminable deviation of the determined actual cost values from the set values for costs is exceeded.

19. The method as claimed in claim 13, further comprising:
   feeding at least one of the status messages and computational results of the computer model to a proposals system for automatically determining at least one proposal for improving cost-effectiveness of the installation.

20. The method as claimed in claim 13, wherein the operation of the installation is monitored by a separate process control system.

* * * * *